United States Patent
Dror et al.

(10) Patent No.: US 8,744,073 B2
(45) Date of Patent: Jun. 3, 2014

(54) DIGITAL RANDOM NUMBER GENERATOR BASED ON DIGITALLY-CONTROLLED OSCILLATORS

(75) Inventors: Itai Dror, Omer (IL); Leonid Minz, Beer Sheva (IL); Boris Dolgunov, Ramat-Gan (IL); Michael Koun, Ashdod (IL)

(73) Assignee: SanDisk IL Ltd., Kfar Saba (IL)

( * ) Notice: Subject to any disclaimer, the term of this patent is extended or adjusted under 35 U.S.C. 154(b) by 901 days.

(21) Appl. No.: 13/203,690

(22) PCT Filed: Feb. 25, 2009
(Under 37 CFR 1.47)

(86) PCT No.: PCT/IL2009/000216
§ 371 (c)(1),
(2), (4) Date: Feb. 27, 2012

(87) PCT Pub. No.: WO2009/109959
PCT Pub. Date: Sep. 11, 2009

(65) Prior Publication Data
US 2012/0213358 A1 Aug. 23, 2012

(30) Foreign Application Priority Data
Mar. 4, 2008 (IL) .......................................... 189921

(51) Int. Cl.
*H03K 3/03* (2006.01)
(52) U.S. Cl.
USPC .................................. 380/28; 331/46; 331/57

(58) Field of Classification Search
CPC ............... H04L 9/06; H04L 9/00; H04L 9/30; H04L 9/18; G06F 7/725; H03B 27/00; H03K 3/0315; H03K 3/354; H03K 3/0322; H03K 3/023; H03L 7/24; H03L 7/0995
USPC .......................................... 380/28; 331/46, 57
See application file for complete search history.

(56) References Cited

U.S. PATENT DOCUMENTS

| | | | |
|---|---|---|---|
| 4,253,114 A * | 2/1981 | Tang et al. | 380/212 |
| 5,963,104 A * | 10/1999 | Buer | 331/78 |
| 6,061,702 A * | 5/2000 | Hoffman | 708/251 |
| 6,715,105 B1 * | 3/2004 | Rearick | 714/30 |
| 7,206,797 B2 * | 4/2007 | Gressel et al. | 708/250 |
| 7,233,212 B2 * | 6/2007 | Boerstler et al. | 331/78 |
| 7,285,964 B1 * | 10/2007 | Hsu et al. | 324/707 |
| 7,307,411 B1 * | 12/2007 | Hsu et al. | 324/76.13 |
| 7,362,946 B1 * | 4/2008 | Kowald | 386/278 |

(Continued)

OTHER PUBLICATIONS

International Search Report for PCT/IL2009/000216, dated Jun. 19, 2009, 8 pages.

(Continued)

*Primary Examiner* — Farid Homayounmehr
*Assistant Examiner* — Sanchit Sarker
(74) *Attorney, Agent, or Firm* — Brinks Gilson & Lione

(57) ABSTRACT

A system for random number generation includes a digital oscillator circuit, which has a set of available configurations and is operative to generate a random number sequence in accordance with a current configuration selected from the set. The system further includes a randomization circuit, which is operative to produce a pseudo-random stream of values corresponding to the available configurations of the digital oscillator circuit, and to control the digital oscillator circuit to alternate among the available configurations in accordance with the pseudo-random stream of values.

17 Claims, 2 Drawing Sheets

(56) References Cited

U.S. PATENT DOCUMENTS

| | | | |
|---|---|---|---|
| 7,660,338 B2* | 2/2010 | Smith et al. | 375/131 |
| 8,531,247 B2* | 9/2013 | Dichtl | 331/78 |
| 2002/0156819 A1* | 10/2002 | Oerlemans | 708/252 |
| 2003/0006849 A1* | 1/2003 | Janssen | 331/78 |
| 2003/0061250 A1* | 3/2003 | Fujita et al. | 708/250 |
| 2003/0176173 A1* | 9/2003 | Klemmer | 455/182.2 |
| 2004/0208322 A1* | 10/2004 | Ozluturk | 380/268 |
| 2006/0220753 A1* | 10/2006 | Boerstler et al. | 331/46 |
| 2007/0100921 A1* | 5/2007 | Barnett et al. | 708/250 |
| 2007/0244951 A1* | 10/2007 | Gressel et al. | 708/252 |
| 2008/0016135 A1* | 1/2008 | Janke et al. | 708/251 |
| 2008/0258825 A1* | 10/2008 | Gressel et al. | 331/78 |
| 2008/0320066 A1* | 12/2008 | Gribok et al. | 708/251 |
| 2009/0110188 A1* | 4/2009 | Dolgunov et al. | 380/28 |
| 2011/0169579 A1* | 7/2011 | Dodrill | 331/46 |
| 2011/0169580 A1* | 7/2011 | Dodrill | 331/56 |
| 2012/0213358 A1* | 8/2012 | Dror et al. | 380/28 |

OTHER PUBLICATIONS

International Preliminary Report on Patentability for PCT/IL2009/000216, dated Sep. 7, 2010, 5 pages.

Dichtl et al., "High-Speed True Random Number Generation with Logic Gates Only", *Cryptographic Hardware and Embedded Systems-CHES 2007*; [*Lecture Notes in Computer Science*], Springer Berlin Heidelberg, Berlin, Heidelberg, vol. 4727, Sep. 10, 2007, pp. 45-62.

Office Action for Chinese Patent Application Serial No. 2009801073473, dated Apr. 5, 2012, 4 pages.

Office Action for Taiwanese Patent Application Serial No. 098107012, dated Apr. 27, 2012, 5 pages.

* cited by examiner

DIGITAL RANDOM NUMBER GENERATOR BASED ON DIGITALLY-CONTROLLED OSCILLATORS

FIELD OF THE DISCLOSURE

The present disclosure relates generally to random number generation, and particularly to Digital Random Number Generator (DRNG) circuits.

BACKGROUND OF THE DISCLOSURE

Random Number Generation (RNG) processes are used in a wide variety of applications, such as in cryptography systems and computer simulations. Some RNG circuits are analog, in which randomness is typically introduced by a randomly-varying physical characteristic of an analog electronic component. Other RNG circuits are fully-digital.

SUMMARY OF THE DISCLOSURE

Embodiments that are described herein provide a system for random number generation, including:
a digital oscillator circuit, which has a set of available configurations and is operative to generate a random number sequence in accordance with a current configuration selected from the set; and
a randomization circuit, which is operative to produce a pseudo-random stream of values corresponding to the available configurations of the digital oscillator circuit, and to control the digital oscillator circuit to alternate among the available configurations in accordance with the pseudo-random stream of values.

In some embodiments, the digital oscillator circuit includes a ring oscillator having configurable feedback taps, and each of the available configurations defines a respective setting of the feedback taps. The set of the available configurations may include at least first and second available configurations that configure the ring oscillator to have respective different first and second lengths. In a disclosed embodiment, the randomization circuit includes a Linear Feedback Shift Register (LFSR). In another embodiment, the randomization circuit is operative to produce the pseudo-random stream of values in accordance with a non-linear function.

In yet another embodiment, the randomization circuit is operative to produce the stream of values in synchronization with a clock signal, and the digital oscillator circuit is operative to produce the clock signal having a random jitter based on the random number sequence, and to drive the randomization circuit with the clock signal.

In still another embodiment, the digital oscillator circuit includes multiple digital oscillator circuits that are operative to produce respective multiple random number sequences in accordance with multiple current configurations selected from their respective sets of available configurations, the randomization circuit includes multiple randomization circuits that are operative to produce multiple respective pseudo-random value streams and to control the respective digital oscillator circuits to alternate among the available configurations in the respective sets in accordance with the respective streams, and the system includes an output circuit, which is coupled to process the multiple random number sequences to produce a composite random number sequence.

In some embodiments, the system includes a cross-randomization circuit, which is coupled to process at least one of the multiple value streams produced by the multiple randomization circuits and to control one or more of the randomization circuits responsively to the processed streams, so as to introduce a dependency among the multiple streams. In an embodiment, the output circuit is further coupled to accept the pseudo-random value streams produced by the randomization circuits, and to produce the composite random number sequence responsively to the pseudo-random value streams.

There is additionally provided, a method for random number generation, including:
operating a digital oscillator circuit, which has a set of available configurations, to generate a random number sequence in accordance with a current configuration selected from the set;
producing a pseudo-random stream of values corresponding to the available configurations of the digital oscillator circuit; and
controlling the digital oscillator circuit to alternate among the available configurations in accordance with the pseudo-random stream of values.

There is further provided, a cryptography apparatus, including:
a cryptography module, which is coupled to carry out a cryptographic operation on data using a random number sequence; and
a random number generation module, including:
a digital oscillator circuit, which has a set of available configurations and is operative to generate the random number sequence in accordance with a current configuration selected from the set; and
a randomization circuit, which is operative to produce a pseudo-random stream of values corresponding to the available configurations of the digital oscillator circuit, and to control the digital oscillator circuit to alternate among the available configurations in accordance with the pseudo-random stream of values.

There is also provided, a memory storage apparatus, including:
a memory;
a cryptography module, which is coupled to carry out a cryptographic operation on data exchanged with the memory using a random number sequence; and
a random number generation module, including:
a digital oscillator circuit, which has a set of available configurations and is operative to generate the random number sequence in accordance with a current configuration selected from the set; and
a randomization circuit, which is operative to produce a pseudo-random stream of values corresponding to the available configurations of the digital oscillator circuit, and to control the digital oscillator circuit to alternate among the available configurations in accordance with the pseudo-random stream of values.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Overview

Embodiments that are described hereinbelow provide improved methods and systems for generating random number sequences. In some embodiments, a Digital Random Number Generator (DRNG) comprises one or more Digitally-Controlled Oscillators (DCOs). Each DCO produces an output waveform having random phase or frequency jitter. The outputs of the DCOs are combined by an output module, which samples the outputs and produces a composite random number sequence.

Each DCO has multiple possible (available) configurations, and may select to operate in any of the available configurations at any given time. The DCOs are controlled by respective randomization modules. Each randomization module generates a stream of pseudo-random values, which are provided as input to the respective DCO. The DCO sets its current configuration in accordance with the current pseudo-random value in the stream. Thus, the DCO alternates among the available configurations in a pseudo-random manner. The pseudo-random configuration switching increases the level of randomness of the random number sequence produced by the DCO.

In some embodiments, the randomization module generates the pseudo-random value stream synchronously with a clock signal, which is produced by the DCO. The random frequency/phase jitter of the DCO output is thus introduced into the clock signal of the randomization circuit, and is then amplified and re-introduced to the DCO by means of the pseudo-random value stream. Therefore, the randomization module can be viewed as an amplification function, which amplifies the random jitter of the DCO.

In some embodiments, the DRNG comprises a cross-randomization module, which introduces a dependency among the different pseudo-random value streams generated by the randomization modules. In turn, this dependency causes a dependency among the different DCO outputs.

The methods and systems described herein provide DRNG circuits that achieve higher levels of randomness in comparison with known circuits. Encryption devices that use the disclosed RNG circuits are typically better suited to current encryption standards and are less vulnerable to side-channel attacks and other unauthorized decoding attempts in comparison with encryption devices using conventional RNG circuits. Since the DRNG circuits described herein are fully digital, they are relatively insensitive to unit-to-unit variations and to variations between different manufacturing processes. The DRNG circuits described herein can thus be embodied in process-independent cores, which can be migrated in a straightforward manner from one device manufacturing process to another.

Although the embodiments described herein mainly address cryptography and data storage applications, the principles of the present disclosure can be used in other applications that involve random number generation, such as in secure communication, computer simulations, computer games and many others.

System Description

Figure 1:
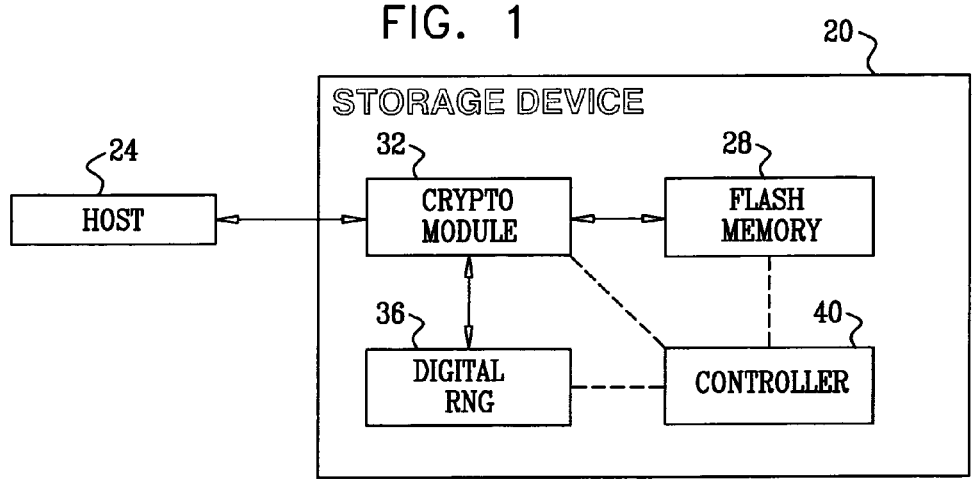
FIG. 1 is a block diagram that schematically illustrates a data storage device.

FIG. 1 is a block diagram that schematically illustrates a data storage device 20, in accordance with an exemplary embodiment. Device 20 may comprise, for example, a removable storage device such as a Disk-on-Key, memory card or smartcard, or any other suitable device type. Device 20 communicates with a host 24, which may comprise, for example, a computing device, a digital camera, a mobile phone, or any other suitable host system that stores data. Host 24 sends data for storage to device 20, and retrieves data that is stored in the storage device. Storage device 20 comprises a memory 28, in the present example comprising a Flash memory. In alternative embodiments, memory 28 may comprise any other suitable type of volatile or non-volatile memory.

A cryptographic module 32 carries out cryptographic operations on data that is written into and read out of memory 28, as well as on data that is exchanged with host 24. For example, module 32 may apply operations such as data encryption, decryption, electronic signing and/or signature verification, as are known in the art. Module 32 may apply any suitable cryptography algorithm, such as, for example, Data Encryption Standard (DES), Triple-DES (3-DES), Rivest, Shamir and Adleman (RSA), Advanced Encryption Standard (AES), and/or any other suitable cryptographic process, for carrying out cryptographic operations.

The cryptographic processes carried out by module 32 use sequences of random numbers, which are produced by a Digital Random Number Generator (DRNG) circuit 36. DRNG 36 is controlled by a controller 40, which also controls and manages the operation of the other components of storage device 20. Cryptographic module 32, RNG circuit 36 and controller 40 are typically implemented in hardware, such as in one or more Application-Specific Integrated Circuits (ASICs) or Field-Programmable Gate Arrays (FPGAs). Controller 40 may be implemented in hardware or firmware, and/or using software running on a suitable processor.

DRNG Configuration

The quality and strength of the cryptographic operations carried out by module 32 typically depend on the level of randomness of the number sequences produced by DRNG 36. The level of randomness may be quantified using any suitable measure that is indicative of the unpredictability of the values of the random number sequences, such as the entropy per output bit of the sequence.

In order to increase the level of randomness of the random number sequences produced by DRNG 36, the DRNG comprises a Digitally-Controlled Oscillator (DCO), which is controlled to alternate among multiple possible configurations in a pseudo-random manner. The pseudo-random configuration switching removes predictable data patterns that may appear in any single configuration of the DCO.

Figure 2:
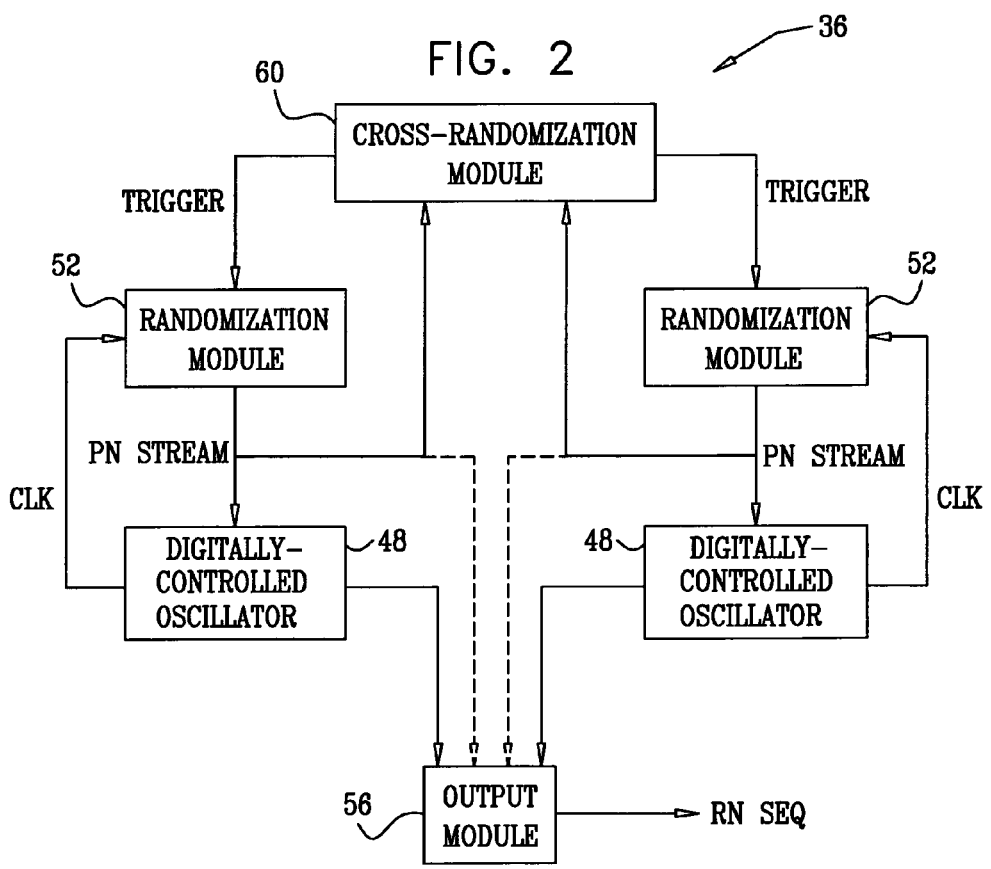
FIG. 2 is a block diagram that schematically illustrates a Digital Random Number Generator (DRNG)

FIG. 2 is a block diagram that schematically illustrates DRNG 36, in accordance with an exemplary embodiment. DRNG 36 comprises one or more DCOs 48. Each DCO produces an output waveform, which has random phase and/or frequency jitter. Each DCO has multiple possible configurations, and can be controlled to operate in any of the configurations at any given time. The RNG typically produces output signals having different randomness characteristics when operating in different configurations.

In some embodiments, DCO 48 comprises a ring oscillator having multiple feedback taps that can be switched on and off to produce different configurations. An exemplary configurable ring oscillator is described in greater detail in FIGS. 3A-3C below. Alternatively, DCO 48 may comprise any other suitable type of externally-configurable oscillator whose output has random characteristics. Several types of externally-configurable oscillators that can be used for this purpose are described, for example, in Israeli Patent Application 187035, entitled "Configurable Random Number Generator," filed Oct. 30, 2007, which is incorporated herein by reference.

Each DCO 48 is controlled by a respective randomization module 52, which sets the current configuration in which the DCO operates at any given time. Randomization module 52 produces a stream of pseudo-random values and provides the stream to DCO 48, and the DCO sets its current configuration in accordance with the current pseudo-random value provided by the randomization module.

The set of the possible pseudo-random values in the stream produced by the randomization module corresponds to the set of possible configurations of the DCO, so that each value selects a certain configuration. For example, the pseudo-random value stream produced by the randomization module may comprise 8-bit words, i.e., 256 different pseudo-random values. The DCO in this example may comprise 256 possible configurations, such that each pseudo-random value in the stream selects a corresponding DCO configuration.

In some embodiments, randomization module 48 comprises a Linear Feedback Shift Register (LFSR), which produces a pseudo-random value at each clock cycle, as is known in the art. Alternatively, the randomization circuit may evaluate a non-linear function, such as a T-function, and generate the pseudo-random value stream in accordance with the function. T-functions are described, for example, by Klimov and Shamir in "Cryptographic Applications of T-Functions," $10^{th}$ Annual International Workshop on Selected Areas in Cryptography (SAC), Ottawa, Canada, Aug. 14-15, 2003, pages 248-261, which is incorporated herein by reference. Further alternatively, the randomization module may use any other suitable means for generating the pseudo-random stream of values.

The randomization module typically generates the pseudo-random value stream in synchronization with a clock signal. In some embodiments, the clock signal is produced by the DCO. Since the DCO output contains random frequency/phase jitter, this jitter is introduced into the clock signal used by the randomization circuit to generate the pseudo-random value stream. The randomization module leverages the relatively small variance (jitter) of the DCO, amplifies this jitter and re-introduces it to the DCO by means of the pseudo-random value stream, so that the DCO output jitter will be larger and more random. Thus, the randomization module can be viewed as an amplification function, which amplifies the random jitter of the DCO.

In the exemplary embodiment shown in FIG. 2, DRNG 36 comprises two DCOs 48 and two corresponding randomization modules 52. The DRNG comprises an output module 56, which samples the outputs of the DCOs to produce respective random number sequences. Module 56 combines the random number sequences produced by the two DCOs to produce a composite pseudo-random sequence. The composite sequence is provided as the RNG output.

Output module 56 may also apply a whitening function, such as a secure hashing function, to the composite number sequence. The whitening operation typically modifies the statistical distribution of the composite sequence and increases its level of randomness. The whitening function is typically non-invertible, i.e., analysis of the output sequence provides little or no information on the input sequence. The whitening function may also balance, i.e., remove biases from the output sequence, for example by diluting the sequence. In embodiments in which the DRNG comprises a single DCO, the output module may sample the DCO output and apply a whitening function to the resulting random number sequence without combining.

In some embodiments, output module 56 further accepts the pseudo-random value streams produced by randomization modules 52, and produces the composite output pseudo-random sequence responsively to the outputs of the DCOs and the randomization modules. Since this configuration provides the output module with additional pseudo-random sources, it is particularly useful for producing high output bandwidths.

In some embodiments, the DRNG comprises a cross-randomization module 60, which introduces a dependency among the different pseudo-random value streams generated by randomization modules 52. In turn, this dependency causes a dependency among the different random number sequences produced by DCOs 48. (Although the random number sequences are actually produced by the output module by sampling the analog outputs of the DCOs, the description that follows sometimes refers to the sequences as being produced by the DCOs, for the sake of clarity. Thus, the DCO and the output module can be viewed collectively as a digital oscillator circuit, which produces a random number sequence.)

Cross-randomization module 60 accepts the different pseudo-random value streams from modules 52 as input. Module 60 applies a certain mixing function (e.g., a XOR function) to the inputs, to produce one or more trigger outputs. The outputs are fed back as inputs to the randomization modules. Typically but not necessarily, the triggers provided to different randomization modules are different from one another.

For example, when the randomization modules comprise LFSRs, the trigger outputs are provided to the inputs of the LFSRs. Alternatively, the cross-randomization module may apply any other means for processing the pseudo-random value streams and to control the randomization modules based on the processed streams, so as to introduce a dependency among the different streams. When the DRNG comprises multiple randomization modules, module 60 may process any desired subset of the streams and/or control any desired subset of the randomization modules.

The exemplary DRNG configuration shown in FIG. 2 is an exemplary configuration, which is chosen purely for the sake of conceptual clarity. In alternative embodiments, the DRNG may comprise any desired number of DCOs and randomization modules of any suitable type. The DRNG may perform additional functions, such as various control functions, interface functions and/or fault detection functions.

Externally-Configurable Ring Oscillator

Figure 3A:
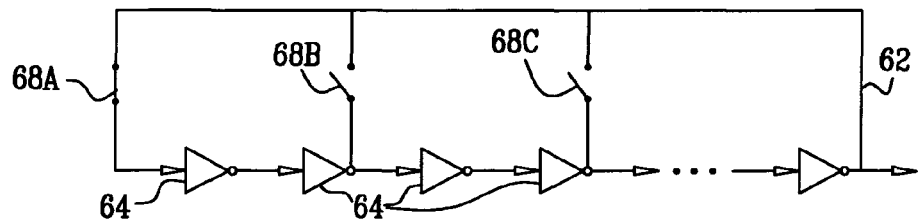
FIGS. 3A-3C are block diagrams that schematically illustrate a Digitally-Controlled Oscillator (DCO)
Figure 3B:
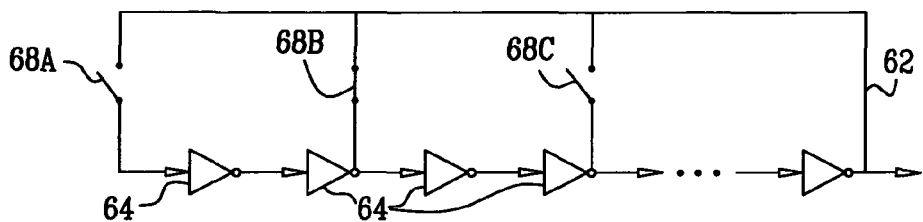
Figure 3C:
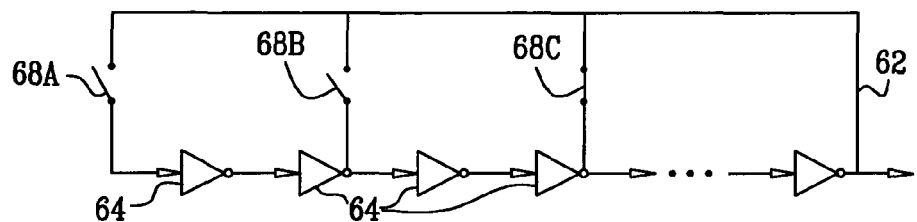

FIGS. 3A-3C are block diagrams that schematically illustrate a Digitally-Controlled Oscillator (DCO) 62, in accordance with an exemplary embodiment. DCO 62 can be used, for example, to implement DCOs 48 in the DRNG configuration of FIG. 2 above. DCO 62 comprises a ring oscillator, i.e., a number of logical inverters 64, which are connected in circular cascade to form a ring. The output of the DCO oscillates between two logical levels (denoted "1" and "0"), thus producing a binary number sequence. The frequency of oscillation is generally determined by the number of inverters 64 and the delay of each inverter. As is well known in the art, phase jitter of inverters 64 causes the DCO output to have random characteristics.

The ring oscillator comprises one or more feedback connections, referred to as taps. Each feedback tap connects the output of a certain inverter 64 to the input of a certain inverter in the ring. One or more of the feedback taps can be switched on and off using external means. In the present example, circuit 62 comprises four switches 68A ... 68D, which can be switched on and off. Each particular setting of switches 68A ... 68D is referred to as a configuration of the DCO. As can be appreciated, modifying the DCO configuration typically modifies the level of randomness of the random number sequences produced by the DCO.

When DCO 62 is controlled by a randomization module, such as module 52 of FIG. 2, each possible pseudo-random value produced by the randomization module corresponds to a particular setting of switches 68A . . . 68D. For any given pseudo-random value provided to the DCO, the DCO sets the switches to the appropriate setting. Thus, when the randomization module drives the DCO with a stream of pseudo-random values, the DCO alternates among the different configurations (the different settings of switches 68A . . . 68D) in a pseudo-random manner.

In some embodiments, the ring oscillator configuration can be modified by modifying the length of the ring oscillator, i.e., the number of inverters that participate in the ring. For example, the switches may bypass or deactivate one or more of the inverters.

FIGS. 3A-3C show three different configurations of DCO 62, i.e., three different settings of switches 68A . . . 68D, which produce random number sequences having different randomness characteristics.

The ring oscillators of FIGS. 3A-3C are shown as examples, which are chosen purely for the sake of conceptual clarity. In alternative embodiments, any other type of ring oscillator having any number of inverters and feedback taps can be used. In some embodiments, only a subset of the feedback taps is switchable. Alternatively, any other mechanism for modifying the ring oscillator configuration can also be used.

The ring oscillator may comprise logical inverters or any other suitable type of delay elements. In some embodiments, the ring oscillator comprises 2n delay elements and comprises an n-bit input for accepting an n-bit pseudo-random value stream. The n-bit pseudo-random values determine $2^n$ different delayed propagation paths, i.e., output waveforms having different time periods.

Random Number Generation Method Description

Figure 4:
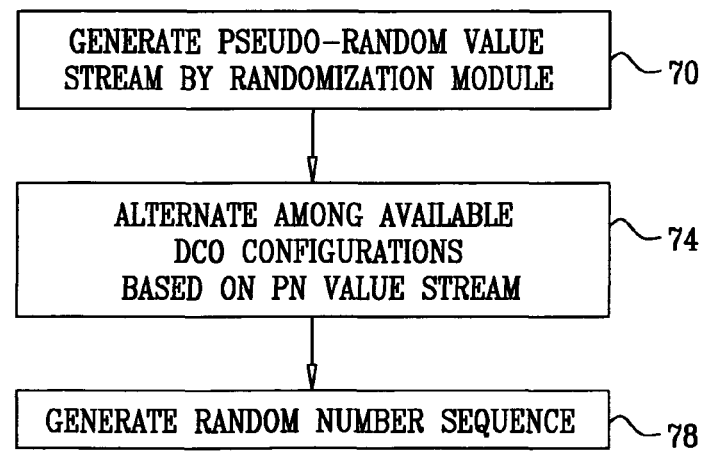
FIG. 4 is a flow chart that schematically illustrates a method for random number generation.

FIG. 4 is a flow chart that schematically illustrates a method for random number generation, in accordance with an exemplary embodiment. The method begins with randomization module 52 generating a pseudo-random value stream, at a stream generation step 70. The stream is provided as input to DCO 48. The DCO alternates among its different available configurations according to the pseudo-random value stream, at an alternation step 74. The DCO generates an output waveform, which is sampled by output module 56 to produce a random number sequence, at a sequence generation step 78. Since the DCO alternates among different configurations in a pseudo-random manner, the level of randomness of the random number sequence is increased.

As explained above, the clock signal used for generating the pseudo-random value stream may be produced by the jittery output of the DCO. Additionally or alternatively, two or more DCOs and randomization modules can be operated and their outputs combined. Dependency may be introduced among the different sequences by means of a cross-randomization module.

Although the embodiments described herein mainly address cryptographic applications, the principles of the present disclosure can be used in other applications that involve random number generation, such as in computer simulations, communication systems, computer games, and many others.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A system for random number generation, comprising:
a digital oscillator circuit, which has a set of available configurations and is operative to generate a random number sequence in accordance with a current configuration selected from the set; and
a randomization circuit, which is operative to produce a pseudo-random stream of values corresponding to the available configurations of the digital oscillator circuit, and to control the digital oscillator circuit to alternate among the available configurations in accordance with the pseudo-random stream of values;
wherein the randomization circuit is operative to produce the stream of values in synchronization with a clock signal, and wherein the digital oscillator circuit is operative to produce the clock signal having a random jitter based on the random number sequence, and to drive the randomization circuit with the clock signal.

2. The system according to claim 1, wherein the digital oscillator circuit comprises a ring oscillator having configurable feedback taps, and wherein each of the available configurations defines a respective setting of the feedback taps.

3. The system according to claim 2, wherein the set of the available configurations comprises at least first and second available configurations that configure the ring oscillator to have respective different first and second lengths.

4. The system according to claim 1, wherein the randomization circuit comprises a Linear Feedback Shift Register (LFSR).

5. The system according to claim 1, wherein the randomization circuit is operative to produce the pseudo-random stream of values in accordance with a non-linear function.

6. The system according to claim 1, wherein the digital oscillator circuit comprises multiple digital oscillator circuits that are operative to produce respective multiple random number sequences in accordance with multiple current configurations selected from their respective sets of available configurations, wherein the randomization circuit comprises multiple randomization circuits that are operative to produce multiple respective pseudo-random value streams and to control the respective digital oscillator circuits to alternate among the available configurations in the respective sets in accordance with the respective streams, and comprising an output circuit, which is coupled to process the multiple random number sequences to produce a composite random number sequence.

7. The system according to claim 6, and comprising a cross-randomization circuit, which is coupled to process at least one of the multiple value streams produced by the multiple randomization circuits and to control one or more of the randomization circuits responsively to the processed streams, so as to introduce a dependency among the multiple streams.

8. The system according to claim 6, wherein the output circuit is further coupled to accept the pseudo-random value streams produced by the randomization circuits, and to produce the composite random number sequence responsively to the pseudo-random value streams.

9. A method for random number generation, comprising:
performing the following in a digital oscillator circuit, which has a set of available configurations:
receiving a pseudo-random stream of values corresponding to the available configurations of the digital oscillator circuit;
controlling the digital oscillator circuit to alternate among the available configurations in accordance with the pseudo-random stream of values; and
generating a random number sequence in accordance with a current configuration selected from the set;
wherein the digital oscillator circuit produces a clock signal having a random jitter that is based on the random number sequence, and wherein the pseudo-random stream of values is generated in synchronization with the clock signal.

10. The method according to claim 9, wherein the digital oscillator circuit comprises a ring oscillator having configurable feedback taps, and wherein each of the available configurations defines a respective setting of the feedback taps.

11. The method according to claim 10, wherein the set of the available configurations comprises at least first and second available configurations that configure the ring oscillator to have respective different first and second lengths.

12. The method according to claim 9, wherein producing the pseudo-random stream of values comprises generating the stream by a Linear Feedback Shift Register (LFSR).

13. The method according to claim 9, wherein producing the pseudo-random stream of values comprises generating the stream in accordance with a non-linear function.

14. The method according to claim 9, wherein operating the digital oscillator circuit comprises operating multiple digital oscillator circuits that are operative to produce respective multiple random number sequences in accordance with multiple current configurations selected from their respective sets of available configurations, wherein producing the pseudo-random stream of values comprises producing multiple respective pseudo-random value streams so as to control the respective digital oscillator circuits to alternate among the available configurations in the respective sets in accordance with the respective streams, and comprising processing the multiple random number sequences to produce a composite random number sequence.

15. The method according to claim 14, and comprising introducing a dependency among the multiple value streams by processing at least one of the streams and controlling generation of one or more of the streams responsively to the processed streams.

16. The method according to claim 14, wherein processing the multiple random number sequences further comprises processing the pseudo-random value streams to produce the composite random number sequence.

17. A method for cryptography, comprising:
performing the following in a memory storage apparatus:
generating a random number sequence with a random number generation module, comprising:
a digital oscillator circuit, which has a set of available configurations and is operative to generate the random number sequence in accordance with a current configuration selected from the set; and
a randomization circuit, which is operative to produce a pseudo-random stream of values corresponding to the available configurations of the digital oscillator circuit, and to control the digital oscillator circuit to alternate among the available configurations in accordance with the pseudo-random stream of values; and
carrying out a cryptographic operation on data using the random number sequence;
wherein the randomization circuit is operative to produce the stream of values in synchronization with a clock signal, and wherein the digital oscillator circuit is operative to produce the clock signal having a random jitter based on the random number sequence, and to drive the randomization circuit with the clock signal.

* * * * *